(12) United States Patent
Borchers et al.

(10) Patent No.: US 9,109,704 B2
(45) Date of Patent: Aug. 18, 2015

(54) COMPRESSED-AIR CONTROL DEVICE WITH MOLDED SEAL

(75) Inventors: Harald Borchers, Bad Nenndorf (DE); Reiner Hölscher, Seelze (DE)

(73) Assignee: WABCO GmbH, Hannover (DE)

( * ) Notice: Subject to any disclaimer, the term of this patent is extended or adjusted under 35 U.S.C. 154(b) by 211 days.

(21) Appl. No.: 13/582,885

(22) PCT Filed: Mar. 7, 2011

(86) PCT No.: PCT/EP2011/001112
§ 371 (c)(1), (2), (4) Date: Sep. 5, 2012

(87) PCT Pub. No.: WO2011/147494
PCT Pub. Date: Dec. 1, 2011

(65) Prior Publication Data
US 2013/0001037 A1  Jan. 3, 2013

(30) Foreign Application Priority Data

May 27, 2010 (DE) .................. 10 2010 021 806

(51) Int. Cl.
*F16D 43/28* (2006.01)
*F16J 15/32* (2006.01)
*F16D 25/08* (2006.01)
*F16J 15/16* (2006.01)

(52) U.S. Cl.
CPC ........... *F16J 15/3236* (2013.01); *F16D 25/083* (2013.01); *F16J 15/164* (2013.01)

(58) Field of Classification Search
USPC ............ 192/85.54, 85.53, 85.51, 85.5, 85.49, 192/85.48, 85.01, 82 R; 137/511, 517, 492; 277/589, 459, 464, 581, 552, 926, 465, 277/582, 563, 574
See application file for complete search history.

(56) References Cited

U.S. PATENT DOCUMENTS

| 6,116,399 | A  | * | 9/2000  | Drexl et al. ................. 192/85.52 |
| 6,502,682 | B2 | * | 1/2003  | Koschmieder et al. .... 192/85.54 |
| 6,851,350 | B2 |   | 2/2005  | Lissel et al. |
| 7,083,170 | B2 |   | 8/2006  | Borstel et al. |
| 2004/0163922 | A1 | * | 8/2004 | Ester ......................... 192/85 CA |
| 2005/0074349 | A1 |   | 4/2005 | Hool et al. |
| 2012/0308424 | A1 | * | 12/2012 | Tadano et al. ................. 418/181 |

FOREIGN PATENT DOCUMENTS

| DE | 33 31 673 A1 | 3/1985 |
| DE | 102 40 093 A1 | 4/2004 |
| DE | 10 2007 061 951 A1 | 6/2009 |

(Continued)

*Primary Examiner* — Ramya Burgess
*Assistant Examiner* — David J Hlavka
(74) *Attorney, Agent, or Firm* — Kramer Levin Naftalis & Frankel LLP

(57) ABSTRACT

A compressed-air control device includes at least one first component, and a second component arranged so as to be movable relative to the first component. A molded seal is arranged in a groove of the first component, and is in contact with the second component. A first chamber formed on one side of the molded seal between the first and the second components can be charged with a first pressure, and a second chamber formed on the opposite side of the molded seal between the first and the second components can be charged with a second pressure. The molded seal together with the first component forms at least one overflow valve.

10 Claims, 3 Drawing Sheets

(56) References Cited

FOREIGN PATENT DOCUMENTS

| | | |
|---|---|---|
| EP | 0 692 659 A1 | 1/1996 |
| EP | 1 267 107 A1 | 12/2002 |
| EP | 1 344 949 A2 | 9/2003 |
| EP | 1 918 602 A2 | 5/2008 |
| GB | 757225 | 9/1956 |
| JP | 53-61595 | 6/1978 |
| JP | 4-113080 | 4/1992 |
| JP | 2004 324750 | 11/2004 |
| WO | WO 2006/066547 A1 | 6/2006 |

* cited by examiner

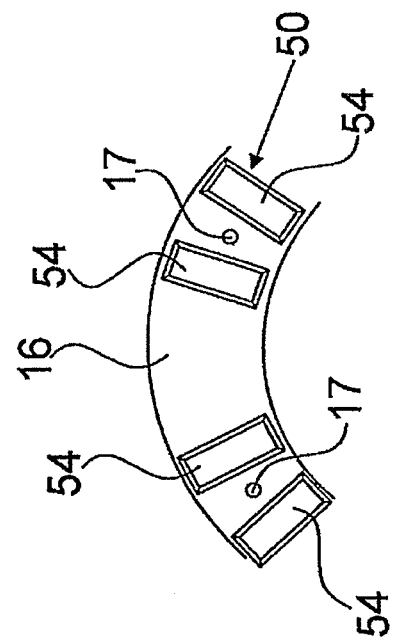
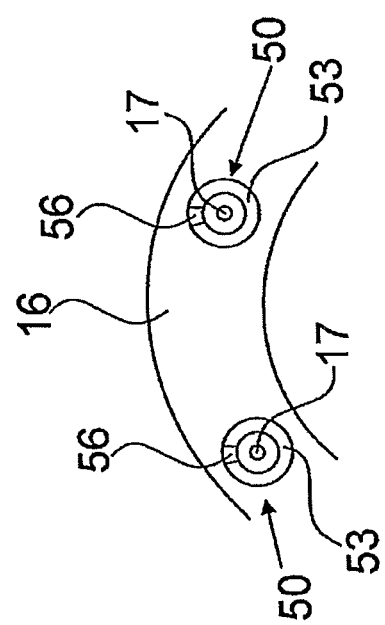

COMPRESSED-AIR CONTROL DEVICE WITH MOLDED SEAL

FIELD OF THE INVENTION

The present invention generally relates to a compressed-air control device having at least one first component and a second component arranged so as to be movable relative to the first component.

BACKGROUND OF THE INVENTION

A device of the general type under consideration can be used to actuate a vehicle clutch in a heavy goods vehicle or in an omnibus, for example. Such a compressed-air control cylinder is described in EP 1 344 949 B1 as having a check valve arranged in the end wall of the housing of the control cylinder. In this way, the control cylinder is improved such that small leakages in the aeration valve do not lead to an undesired pressure build-up and therefore to a deployment of the control cylinder piston rod.

SUMMARY OF THE INVENTION

Generally speaking, it is an object of the present invention to provide an improved compressed-air control device having at least one first component and a second component movable relative to the first component that solves the problem of compensating for small leakages in a more cost-effective manner.

According to an embodiment of the present invention, the problem of compensating for an undesired pressure arising as a result of a small leakage is solved in a simple manner, without the use of additional components. A molded seal, which is required in the device in any case for sealing between two pressure chambers, can be used together with a part of the device to form an overflow valve. This has the advantage that no additional components are required, and therefore the invention can be realized in a very cost-effective manner. This advantageously includes the molded seal, which is to be understood to mean a seal with a certain, generally asymmetrical cross-sectional profile. As a result of the profiling, the molded seal has a defined position within the device—in contrast to an O-ring, for example.

An overflow valve is a valve that closes above a certain pressure value or above a difference of pressures and opens below the pressure or the pressure difference. In one embodiment of the invention, the overflow valve is configured so as to compensate for leakages of up to 1.5 bar; that is, the overflow valve separates the first chamber from the second chamber only when a pressure value of 1.5 bar is exceeded.

In another embodiment of the invention, a restoring element is provided, by means of which the overflow valve can be acted on in the opening direction. Through corresponding dimensioning of the restoring element, it is possible to set a desired closing pressure of the overflow valve. The restoring element may, for example, be in the form of a compression spring or tension spring.

In a further embodiment, the molded seal has at least one closable passage duct via which the first chamber can be connected to the second chamber. This permits a simple realization of the overflow valve in existing designs of molded seals. The passage duct may be realized for example in the form of a bore.

In a still further embodiment of the invention, the passage duct can be closed off by a wall of the groove.

In another embodiment, the groove width is greater than the width of the molded seal. Here, the molded seal can be displaced within the groove, that is, over the extent of the groove width, as a result of a pressure difference between the first and the second pressure. The desired valve function of the overflow valve can be realized by means of the displaceability of the molded seal. In combination with the refinement that the passage duct can be closed off by a wall of the groove, the overflow valve can be realized in a simple manner.

In a further embodiment of the invention, at least one restoring element is arranged between the groove wall and that side of the passage duct of the molded seal that can be sealed off by means of the groove wall. A restoring element of this type generates a certain force by means of which the overflow valve can be acted on in the opening direction. The restoring element may be realized for example in the form of a spring.

According to another embodiment, the molded seal has, on that side of the passage duct that can be sealed off by means of the groove wall, at least one restoring element that projects from the surface of the molded seal. In this way, the restoring element may advantageously be formed so as to be integrated into the molded seal. This has advantages during the assembly of the inventive device because the restoring element need not be installed as a separate component, but rather is installed simultaneously with the insertion of the molded seal. The restoring element may advantageously also be produced from the material of the molded seal. If an elastic material is used, the restoring element generates a resilient force, the magnitude of which can be selected through corresponding shaping of the restoring element and the material elasticity.

In one embodiment of the invention, the overflow valve has, on the outflow side, an air guide by means of which outflowing air is directed at an angle towards the surface of the first and/or second component. As a result, the outflowing air flows not parallel or perpendicular to the surface, but rather impinges on the surface at an angle, that is, at an angle not equal to 0 degrees or 90 degrees. Such an air guide has the advantage that the air flow can blow undesired dust away from the surface of the first and/or second component, and a dust-free or at least low-dust environment can thus be maintained in the region. This has advantages in particular if the inventive device is used for the actuation of a vehicle clutch, because in such installation situations, increasing amounts of dust are generated as a result of clutch abrasion. The air guide may be integrated into the molded seal, the first component or into the molded seal and the first component.

In one embodiment of the invention, the molded seal is in the form of a molded sealing ring, in particular in the form of a lip sealing ring. This permits the use of common, commercially available components. In another embodiment, a multiplicity of restoring elements is distributed over the circumference of the molded sealing ring.

In a further embodiment of the invention, the device includes the following features:
 a) the first component is a compressed-air-actuatable piston,
 b) the second component is a cylinder,
 c) the piston is arranged in the cylinder,
 d) the first chamber is a compressed-air actuation chamber for compressed-air actuation of the piston,
 e) the compressed-air actuation chamber is formed between the piston and the cylinder and is sealed off by the molded seal.

This permits a cost-effective realization of a compressed-air-actuatable control cylinder with integrated overflow valve.

In another embodiment of the invention, the device has the following features:

a) the piston is in the form of an annular piston,
b) the cylinder is in the form of an annular cylinder,
c) the annular piston is arranged concentrically in the annular cylinder.

This permits the more cost-effective realization of a compressed-air-actuatable control cylinder in the form of a concentric control cylinder. It is possible in this way to realize a device wherein a substantially annular pressure medium chamber is formed between the annular cylinder and the annular piston, and wherein the annular piston is movable relative to the annular cylinder when the pressure medium chamber is charged with pressure.

In yet another embodiment of the invention, the device is in the form of a clutch actuation control cylinder for the actuation of a vehicle clutch.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention will be explained in more detail below on the basis of exemplary embodiments and with reference to the accompanying drawings, in which:

FIGS. 3 and 4 show embodiments of a molded seal in accordance with the present invention.

In the figures, the same reference numerals are used for corresponding elements.

DETAILED DESCRIPTION OF THE PREFERRED EMBODIMENTS

Figure 1:
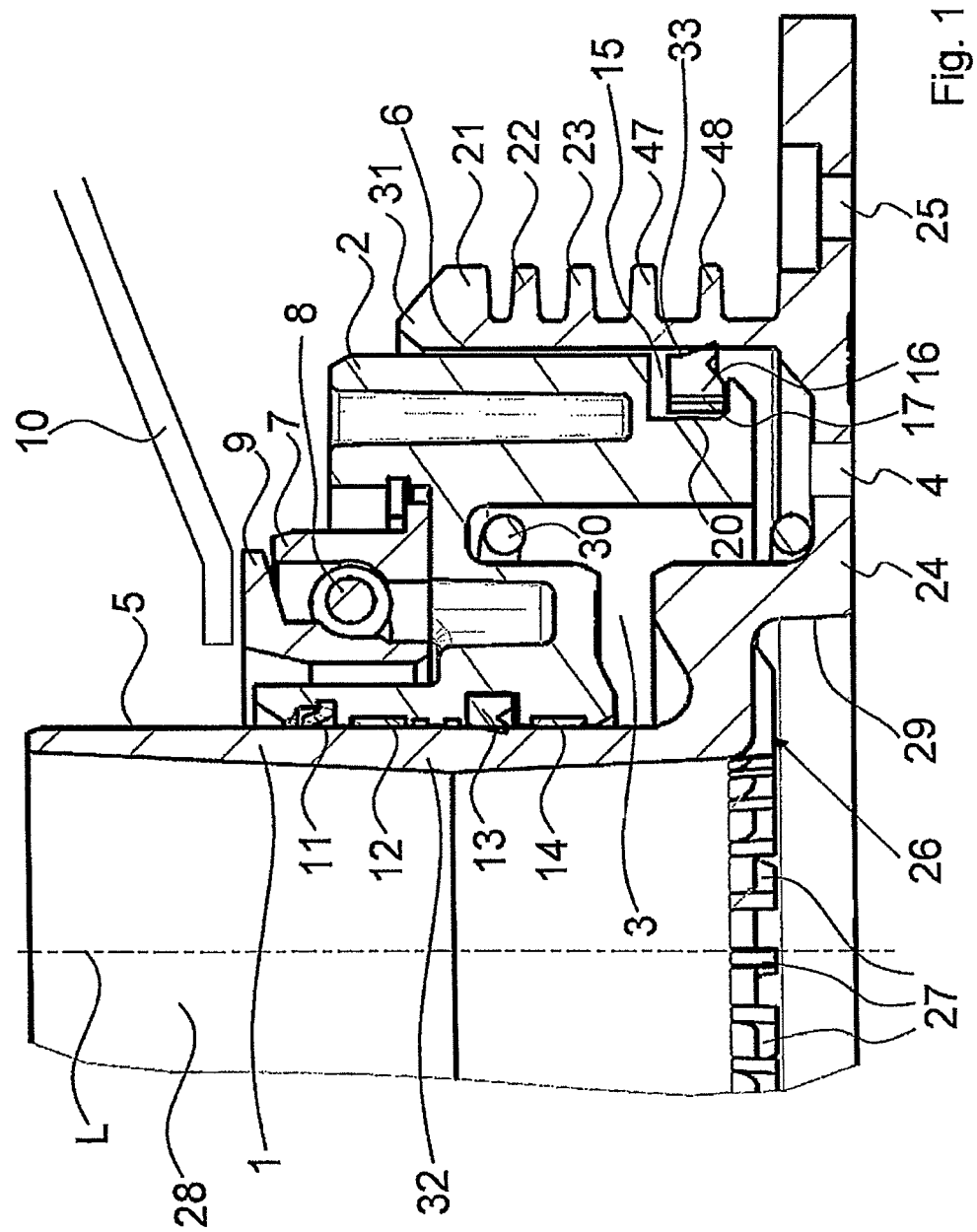
FIG. 1 is a sectional view of a device according to an embodiment of the invention.

FIG. 1 shows the device according to an embodiment of the present invention in a sectional illustration, wherein only one half of the device is illustrated because the device is symmetrical, and the other half, which is not illustrated, is of substantially identical construction.

An annular cylinder 1 is shown having a substantially cylindrical opening 28, which is continuous in the centre in the direction of a longitudinal axis L of the annular cylinder 1. When the annular cylinder is used as an actuating device for a vehicle clutch, the transmission shaft can be guided through the opening 28. The annular cylinder 1 has a first diameter in the region of the opening 28. In a transition region 26, the diameter of the annular cylinder increases to a second, larger diameter to a wall 29. The annular wall 29 may serve for example as a receptacle for a centering flange of a transmission. In this way, the device illustrated in FIG. 1 can be quickly mounted in a centered fashion on a transmission. The annular cylinder 1 extends onward beyond a rear wall 24. In an outer flange region of the rear wall 24 there is provided a fastening opening 25 by means of which the annular cylinder can be screwed to a holding plate of a transmission. The annular cylinder 1 furthermore extends away from the rear wall 24 again in a region 31 formed as an outer wall. In this way, the annular cylinder forms an annular cavity between the wall 32, which delimits the opening 28, and the outer wall 31.

Lamellar reinforcement ribs 27 are provided in the region of the transition from the first to the second inner diameter of the annular cylinder 1. These reinforcement ribs extend along the longitudinal axis L and furthermore outward in the radial direction from the wall 32, which delimits the opening 28. The reinforcement ribs 27 are of relatively narrow construction, wherein the spacing between two reinforcement ribs may be, for example, approximately three times as large as the width of a reinforcement rib. As can likewise be seen in FIG. 1, the reinforcement ribs 27 have a form such that a transmission of force from the annular cylinder region with the smaller diameter into the region with the larger diameter is distributed uniformly in the material.

An annular piston 2 is arranged on the annular cylinder 1. The annular piston 2 forms, with the side walls 31, 32 of the annular cylinder 1 and the rear wall 24, a pressure medium chamber 3, which can be acted on with pressure medium, for example compressed air, via a pressure medium supply opening 4. On the annular cylinder 2 there is arranged an actuation plate 9 by means of which a clutch release element 10 is acted on with force upon pressurization of the pressure medium chamber 3. The actuation plate 9 is connected to the annular cylinder 2 via a ball bearing 8 and a ball receiving ring 7. Here, the ball receiving ring 7 is fixedly connected to the annular cylinder 2, for example by being pressed or screwed in.

Within the pressure medium chamber 3 there is arranged a compression spring 30. By means of the compression spring 30, the annular piston 2 is pressed under slight preload against the clutch release element 10 via the actuation plate 9. The annular cylinder 2 is held in a defined position in the pressureless state by the compression spring 30.

The annular cylinder 1 has an inner running surface 5 and an outer running surface 6 for the annular piston 2. All of the sealing and scraper elements 11, 12, 13, 14, 16 that act between the annular piston 2 and the annular cylinder 1 are fastened directly to the annular piston 2, that is, without additional components such as, for example, an intermediate piece or an additional retaining element. On the inner side of the annular piston 2 there are provided annular seals 1, 12, 13, 14, which are in contact with the inner running surface 5. On the outer circumference of the annular piston 2, a lip sealing ring 16 is arranged in an encircling outer groove 20 of the annular piston 2. The lip sealing ring 16 bears with its sealing lip against the outer running surface 6 of the annular cylinder 1. Above the lip sealing ring 16 there is formed an annular chamber 33. The lip sealing ring 16 has a passage duct 17 via which the pressure medium chamber 3 can be connected to the annular chamber 33.

The annular cylinder 1 and the annular piston 2 can be produced from cast aluminum. On the annular cylinder 1, both the inner running surface 5 and also the outer running surface 6 can be anodized.

In the region 31, the annular cylinder 1 has radial reinforcement ribs 21, 22, 23, 47, 48 that encircle the longitudinal axis L of the annular cylinder.

It should be understood that the present invention can be advantageously used not only in the concentric control cylinder described on the basis of the embodiment depicted in FIG. 1, but rather also in any pressurizable device in which a molded seal is provided between two pressurizable chambers.

Figure 2:
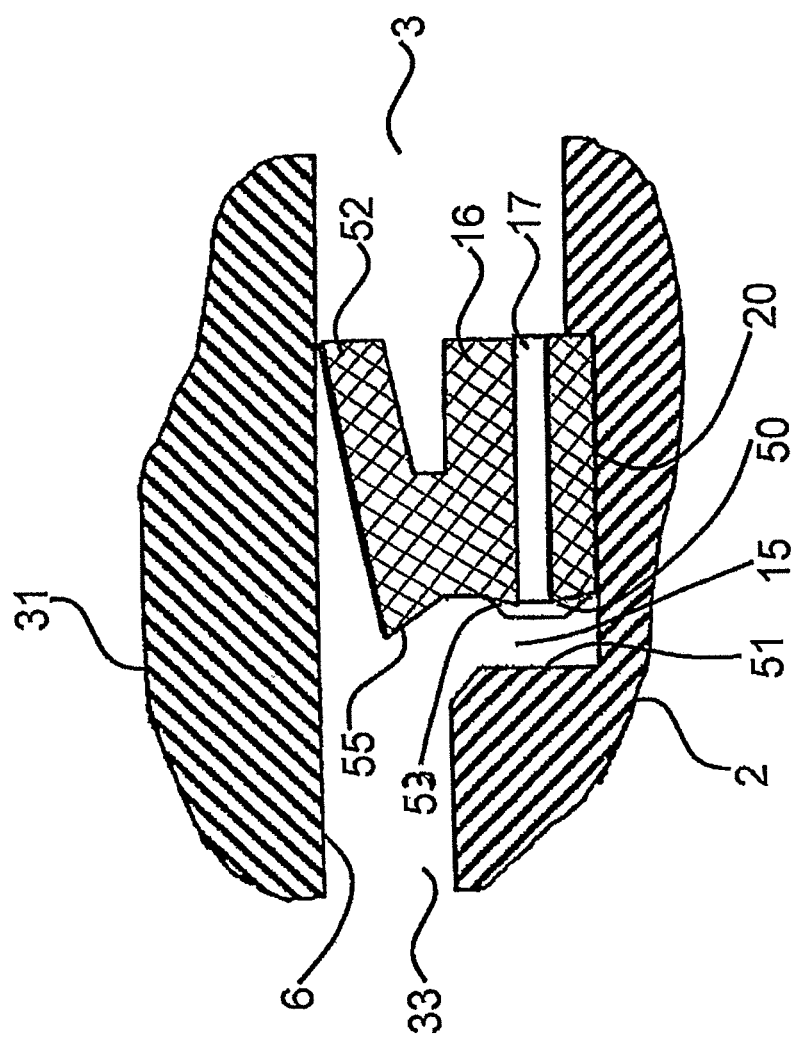
FIG. 2 is an enlarged sectional view of an overflow valve realized in the embodiment of the device depicted in FIG. 1.

FIG. 2 shows a detail of the device as per the embodiment depicted in FIG. 1 in the vicinity of the lip sealing ring 16. FIG. 2 shows the housing part 31 of the annular cylinder 1, the annular piston 2 and the lip sealing ring 16 arranged in the groove 20. As can be seen, the groove 20 is wider than the width of the lip sealing ring 16. As a result, the lip sealing ring 16 is displaceable in the longitudinal direction. A sealing lip 52 bears against the inner wall 6 of the housing region 31 and seals off the pressure medium chamber 3 with respect to the annular chamber 33, which is connected to the atmosphere.

The lip sealing ring 16 has a passage duct 17 via which, in the position of the lip sealing ring 16 illustrated in FIG. 2, the pressure medium chamber 3 is connected to the annular chamber 33. On the side facing towards the annular chamber 33, the lip sealing ring 16 has a restoring element 50, which may be arranged for example substantially annularly around the outflow opening of the passage duct 17. Here, the passage duct 17 and the restoring element 50 interact with a wall 51 of the groove 20 so as to form the overflow valve. The restoring element 50 has a side wall 53 that may run obliquely.

In the event of an increase of the pressure in the pressure medium chamber 3, the lip sealing ring 16 is situated initially in the position illustrated in FIG. 2. Here, air can escape from the pressure medium chamber 3 through the passage duct 17 into the annular chamber 33 and, thus, into the atmosphere. In the event of an increase of the pressure in the pressure medium chamber 3 above a predefined closing pressure, as a result of the relatively small passage cross section of the passage duct 17, a corresponding dynamic pressure builds up, which causes the lip sealing ring 16 to be moved to the left towards the wall 51 of the groove 20. As a result, the passage duct 17 is closed off by the wall 51, and the overflow valve is thereby closed. In this state, no further compressed air can escape from the pressure medium chamber 3.

If the pressure in the pressure medium chamber 3 decreases below an opening pressure, the restoring element 50, which may be formed for example from the same elastic material as the lip sealing ring 16, causes a restoring movement of the lip sealing ring 16 at least to such an extent that air can again escape from the pressure medium chamber 3 via the passage duct 17 into the annular chamber 33 and, thus, into the atmosphere. The gap 15 generated here by the restoring element 50 between the lip sealing ring 16 and the wall 51 is illustrated on an enlarged scale in FIG. 2 for illustrative purposes. In practice, the relative gap is selected to be sufficient to allow undesired compressed air to escape from the pressure medium chamber 3.

The air flowing out via the passage duct 17 into the annular chamber 33 is diverted at a certain angle by means of an air guide 55, which may be formed as an oblique shoulder of the lip sealing ring 16, such that the air impinges on the outer running surface 6 of the annular cylinder 1 at an angle. Here, the outflowing air has the additional advantageous effect that dust that has accumulated on the running surface 6 is blown away.

FIG. 3 shows an embodiment of a passage opening 17 and of the restoring element 50 on the lip sealing ring 16 in a plan view of a segment of the lip sealing ring 16. As can be seen, it is also possible for a plurality of passage ducts 17 with corresponding restoring elements 50 to be provided. The annular restoring elements 50 each have outflow openings 56 in the form of a passage duct. Via the outflow openings 56, the air flowing out of the passage opening 17 can escape from the annular chamber formed by the annular restoring element 50.

FIG. 4 shows restoring elements in the form of rectangular elevations 54 on the lip sealing ring 16. In each case, one pair of elevations 54 is arranged on opposite sides of a passage duct 17. The elevations 54 are of relatively flat form, such that adequate sealing of the passage ducts 17 can still be attained if a correspondingly high pressure prevails in the pressure medium chamber 3. Here, the pressure in the pressure medium chamber 3 causes a certain deformation in the form of bending of the lip sealing ring 16, as a result of which the outlet openings of the passage ducts 17 are pressed against the wall 51 and thereby closed off.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A device, comprising:
   a compressed-air-actuatable piston;
   a cylinder arranged so as to be movable relative to the compressed-air-actuatable piston;
   a molded seal arranged in a groove defined in the compressed-air-actuatable piston, the molded seal being in contact with the cylinder;
   a compressed-air actuation chamber for compressed-air actuation of the piston formed on one side of the molded seal between the compressed-air-actuatable piston and the cylinder, the compressed-air actuation chamber being chargeable with a first pressure and sealed off by the molded seal; and
   a second chamber formed on an opposite side of the molded seal between the at least one compressed-air-actuatable piston and the cylinder, the second chamber being chargeable with a second pressure, the molded seal together with the at least one first component forming at least one overflow valve.

2. The device according to claim 1, further comprising at least one restoring element by which the at least one overflow valve can be acted on in an opening direction.

3. The device according to claim 1, wherein the molded seal has at least one closeable passage duct via which the compressed-air actuation chamber is connectable to the second chamber.

4. The device according to claim 3, wherein the at least one closeable passage duct is closeable by a wall of the groove.

5. The device according to claim 1, wherein a width of the groove is greater than a width of the molded seal, and wherein the molded seal is displaceable within the groove by a pressure difference between the first and the second pressure.

6. The device according to claim 4, wherein the at least one restoring element is arranged between the wall of the groove and a side of the passage duct that is closeable by the wall of the groove.

7. The device according to claim 6, wherein at least one of the at least one restoring element projects from a surface of the molded seal on the side of the passage duct that is closeable by the wall of the groove.

8. The device according to claim 1, wherein the at least one overflow valve has, on an outflow side, an air guide by which outflowing air is directed at an angle towards a surface of at least one of the at least one first component and the second component.

9. The device according to claim 1, wherein:
   a) the compressed-air-actuatable piston is an annular piston,
   b) the cylinder is an annular cylinder, and c) the annular piston is arranged concentrically in the annular cylinder.

10. The device according to claim 1, wherein the device is a clutch actuation control cylinder for actuating a vehicle clutch.

* * * * *

UNITED STATES PATENT AND TRADEMARK OFFICE
CERTIFICATE OF CORRECTION

PATENT NO. : 9,109,704 B2
APPLICATION NO. : 13/582885
DATED : August 18, 2015
INVENTOR(S) : Harald Borchers et al.

It is certified that error appears in the above-identified patent and that said Letters Patent is hereby corrected as shown below:

In the claims:

In claim 1:

Column 6, line 33, should be corrected as follows:

molded seal between the "at least one" compressed-air-

Column 6, line 36, should be corrected as follows:

seal together with the "at least one first component"

-- compressed-air-actuatable piston -- form-

Signed and Sealed this
Nineteenth Day of January, 2016

Michelle K. Lee
*Director of the United States Patent and Trademark Office*